(12) United States Patent
Rhyne, IV et al.

(10) Patent No.: US 8,147,306 B2
(45) Date of Patent: Apr. 3, 2012

(54) METHOD FOR DYNAMIC CONTENT GENERATION IN A ROLE-PLAYING GAME

(75) Inventors: V. Thomas Rhyne, IV, Austin, TX (US);
Joseph W. Barry, Walpole, MA (US);
Andrew R. Menard, Waltham, MA (US)

(73) Assignee: Rampart Studios, LLC, Manchester, NH (US)

( * ) Notice: Subject to any disclaimer, the term of this patent is extended or adjusted under 35 U.S.C. 154(b) by 0 days.

(21) Appl. No.: 12/616,240

(22) Filed: Nov. 11, 2009

(65) Prior Publication Data

US 2010/0056236 A1 Mar. 4, 2010

Related U.S. Application Data

(63) Continuation of application No. 11/017,318, filed on Dec. 20, 2004, now Pat. No. 7,637,806.

(51) Int. Cl.
*A63F 13/10* (2006.01)
*A63F 13/12* (2006.01)

(52) U.S. Cl. ............... 463/9; 463/23; 463/40; 463/42

(58) Field of Classification Search ............... 463/3, 4, 463/6, 8, 9, 23, 2, 5, 7, 40–42; 700/91, 92
See application file for complete search history.

(56) References Cited

U.S. PATENT DOCUMENTS

| 4,572,509 A | 2/1986 | Sitrick |
| 5,498,002 A | 3/1996 | Gechter |
| 5,816,920 A | 10/1998 | Hanai |
| 6,009,458 A | 12/1999 | Hawkins et al. |
| 6,106,399 A | 8/2000 | Baker et al. |
| 6,168,524 B1 | 1/2001 | Aoki et al. |
| 6,352,479 B1 | 3/2002 | Sparks |
| 6,767,287 B1 | 7/2004 | McQuaid et al. |
| 2004/0024721 A1* | 2/2004 | Donovan et al. ............... 706/46 |
| 2004/0093372 A1* | 5/2004 | Chen et al. ............ 709/203 |
| 2004/0143852 A1* | 7/2004 | Meyers ............ 725/133 |
| 2004/0176163 A1* | 9/2004 | Ishihata et al. ............ 463/30 |

OTHER PUBLICATIONS

"Conflict: Desert Storm," Xbox game, published by Gotham Games, manual downloaded form www.replacementdocs.com, May 8, 2009 in parent case U.S. Appl. No. 11/017,318.*

(Continued)

*Primary Examiner* — David L Lewis
*Assistant Examiner* — Matthew D. Hoel

(57) ABSTRACT

The invention provides a role-playing game environment wherein the nature of various NPCs within the game may be varied over time within the game. The goals of various NPCs within the game may be dynamically and automatically changed within the game. At certain in-game time periods, the game server may dynamically assign one or more new goals for some or all of the NPCs based on the current status of each NPC. When a player later interacts with a given NPC assist (or impede) that NPC in reaching its currently assigned goal, the method may dynamically determine a steps that the player's avatar may perform to assist (or impede) the goal. Thus, players cannot predict what will happen when they move through the game and reach a location at which they can interact with a given NPC, making the game-playing experience ever fresh and challenging.

20 Claims, 8 Drawing Sheets

OTHER PUBLICATIONS www.ign.com review of "Conflict: Desert Storm" Xbox game, http://xbox.ign.com/objects/478/478672.html, downloaded May 8, 2008 in parent case U.S. Appl. No. 11/017,318.*

"Halo" for PC, 2003, Microsoft Corporation, manual downloaded from www.replacementdocs.com, Nov. 18, 2008 in parent case U.S. Appl. No. 11/017,318.*

IGN review of "Halo" PC game, http://pc.ign.com/objects/764/764703.html, downloaded Nov. 18, 2008 in parent case U.S. Appl. No. 11/017,318.*

"A Wish List for Massively Multiplayer Games," Dr. Richard A. Bartle, MUSE Ltd., Sep. 2001.

Richard Bartle, "Planning and Quest Generation," Notes from the Dawn of Time #29 http:/www.skotos.net/articles/dawnof29.shtml (3 pages).

Richard Bartle, Ways to Look at Plans: Part 1, Notes from the Dawn of Time #30 http:/www.skotos.net/articles/dawnof30.shtml (3 pages).

Richard Bartle, Ways to Look at Plans: Part 2, Notes from the Dawn of Time #31 http:/www.skotos.net/articles/dawnof31.shtml (3 pages).

"Conflict: Desert Storm," Xbox game, published by Gotham Games, manual downloaded from www.replacementdocs.com.

www.ign.com review of "Conflict: Desert Storm" Xbox game, http://xbox.ign.com/objects/478/478672.html, downloaded May 8, 2008.

"Halo" for PC, 2003, Microsoft Corporation, manual downloaded from www.replacementdocs.com, Feb. 27, 2006.

IGN review establishing "Halo" PC release date of Oct. 16, 2003, http://pc.ign.com/objects/764/764703.html, downloaded Nov. 18, 2008.

* cited by examiner

```
struct    NPC         // Non-Player Character
{
    char character_name[25];
    int  character_number;
    int  age;            // may change as in-game time advances
    int  residenceID;    // may change as NPC is relocated
    int  villageID;
    int  jobID;
    int  titleLevel;

// Priorities - Values based on loyalties and responsibilities
    int  town_priority;
    int  family_priority;
    int  faction_priority;
    int  love_priority;

// Character values
    int  morality;
    int  greed;
    int  ambition;

// Volatiles, which change with time and/or activity
    int  happiness;
    int  wealth;
    int  status;
    int  possessions[10];    // list of in-game possessions by number
    int  currently_assigned_goal;
};
```

*FIG. 3*

```
struct    player   // partial description of an avatar
{
    char player_name[25];
    // current state
    int  strength;
    int  dexterity;
    int  stamina;
    int  intelligence;
    int  wisdom;
    // list of all skills and skill-levels currently acquired
    float    skills_and_ratings[25,2];
    int  possessions[25];
};
```

*FIG. 4*

```
struct   goal
{
     char goal_name[25];
     int  goal_number;

// not all of the following requirements need to be
specified
     int  town_priority_min;
     int  town_priority_max;
     int  family_priority_min;
     int  family_priority_max;
     int  faction_priority_min;
     int  faction_priority_max;
     int  love_priority_min;
     int  love_priority_max;
     int  morality_min;
     int  morality_max;
     int  greed_min;
     int  greed_max;
     int  ambition_min;
     int  ambition_max;
     int  happiness_min;
     int  happiness_max;
     int  wealth_min;
     int  wealth_max;
     int  stealth_min;
     int  stealth_max;
     int  required_possessions[10];
     int  lifetime   // Number of In-Game Time Periods

[OTHER REQUIRED IN-GAME STATE(S) AS DEFINED IN THE
     GAME
      ENVIRONMENT]

```
struct    step
{
    char   step_name[25];
    int    step_number;       // used to identify steps in list
    // Requirements on NPC
    int    town_priority_min;
    int    town_priority_max;
    int    family_priority_min;
    int    family_priority_max;
    int    faction_priority_min;
    int    faction_priority_max;
    int    love_priority_min;
    int    love_priority_max;
    int    morality_min;
    int    morality_max;
    int    greed_min;
    int    greed_max;
    int    ambition_min;
    int    ambition_max;
    int    happiness_min;
    int    happiness_max;
    int    wealth_min;
    int    wealth_max;
    int    stealth_min;
    int    stealth_max;
    int    required_possessions[10];
    // Requirements on player character
    int    strength_min;
    int    strength_max;
    int    dexterity_min;
    int    dexterity_max;
    int    stamina_min;
    int    stamina_max;
    int    intelligence_min;
    int    intelligence_max;
    int    wisdom_min;
    int    wisdom_max;
    // List of all skills and min/max skill-levels required
    float  skills_and_ratings[25,3];
    // details of step which must be performed

[GAME DEPENDENT.  MUST BE DEFINED IN TERMS OF THE MANNER IN WHICH
     IN-GAME ACTIVITIES ARE DEFINED AND PERFORMED...]

// Results of performing the step for the associated NPC
    int    new_residenceID;
    int    new_villageID;
    int    new_jobID;
    int    new_titleLevel;
    int    change_in_town_priority;
    int    change_in_family_priority;
    int    change_in_faction_priority;
    int    change_in_love_priority;
    int    change_in_morality;
```

*FIG. 6*

METHOD FOR DYNAMIC CONTENT GENERATION IN A ROLE-PLAYING GAME

CROSS-REFERENCE TO RELATED APPLICATIONS

This application is a continuation of U.S. application Ser. No. 11/017,318, filed Dec. 20, 2004, now U.S. Pat. No. 7,637,806, naming V. Thomas Rhyne IV, Joseph W. Barry, and Andrew R. Menard as inventors.

FIELD OF THE INVENTION

The present invention relates generally to role-playing games (RPGs). More particularly, the present invention relates to providing variable experiential content for the human players of such games, especially players in Massively Multi-player On-line Games.

BACKGROUND OF THE INVENTION

Computer-based RPGs have been around for decades, dating back to highly fixed single-user, text-based games such as the venerable Zork. Zork was an early role playing game wherein players were required to determine, as they interacted with the game as defined by its software, the nature of fixed, predefined plot lines in order to advance through sequences of predefined locations and events and reach the end of the game.

Later, multi-player on-line RPGs were developed which allowed human players to interact with each other within computer-generated virtual environments supported through a combination of software running on their own computer and software provided, via a communications linkage, by a game server. These games have come to be known as Massively Multi-player On-line Games or MMOGs. These role-playing games allow large number of on-line users to participate in the game-playing experience together, cooperating with each other or, conversely, obstructing each other, as they try to accomplish tasks within the computer-based environment. Early MMOGs include UltimaOnLine and Everquest™. U.S. Pat. No. 6,767,287 B1, for example, discloses a computer system and method for implementing such a game. This patent is assigned to Sony Computer Entertainment, the vendor of Everquest™ and other MMOGs.

Traditional MMOGs have provided only a fixed set of locations, a fixed set of computer-generated characters (known herein as Non-Playing Characters or NPCs), and a fixed set of events that the human players can interact with. Human players are represented by in-the-game characters commonly known as avatars, which the human player can move from place to place within the virtual environment of the game. In so doing, the human player, through his/her avatar, can interact with various NPCs. Each NPC generally has assigned traits which define (and also limit) the interactions it can support, as well as an assigned goal in which a player (or multiple players) can become involved, either by assisting or impeding the NPC in achieving that goal.

MMOG Players may pay fees to maintain their right to continue access to the game server that maintains and supports their in-game interactions. If required, that fee keeps their in-the-game avatar "alive" from session to session within the virtual game environment, along with the status the player has achieved for their avatar as they have played the game. Status is generally modified by in-game experiences such as overcoming obstacles or gathering possessions. Status may also be decreased by negative experiences, such as being killed by a foe.

In traditional RPGs, however, the natures of the environment, NPCs, and experiences available to the player are generally largely fixed, meaning that repeated player activities along the same path in the in-game environment will produce essentially the same results. For example, if entry to a particular location produces the appearance of a computer-generated monster (a form of NPC), which must be dispatched in order to move through that location to the next, each subsequent entry to that location will cause the same monster to appear and be dispatched, generally by performing the same sort of attack on the monster that was performed the first time. Thus, repeated interactions with the same NPC, e.g., a vendor in a computer-generated marketplace, will result in the same sequence of events. A given vendor, for example, might sell a needed weapon, but that specific NPC will always (and only) sell that same weapon in the same manner. Further, if a given NPC has a goal, such as becoming mayor of his or her town, once that goal has been accomplished, a human player can no longer have a meaningful interaction with that NPC, but rather the NPC may only state "Thanks for helping me become mayor."

The end result of the fixed nature of current MMOGs has too often been a loss of interest by the fee-paying players who grow tired of the repetitive nature of their game-playing experiences and, hence, terminate their subscription to the game service. As a result, game providers generally employ teams of software developers who work to develop new content for their on-line games. These developers labor to create new locations, new NPCs, and new in-game experiences by releasing so-called "patches" from time to time so that experienced players can have new experiences within the on-line environment. In so doing, however, the nature of the previously defined portion of the game environment is rarely, if ever, modified. Thus, even with occasional opportunities to have new experiences within the added aspects of a newly "patched" on-line game environment, experienced players are still faced with the previously experienced and unchanged game situations and characters.

For these and other reasons, there is a need for a method of varying the in-game environment from time-to-time so that players are presented with new and different opportunities to have in-game experiences, such as with NPCs whose in-game goals have been changed.

BRIEF SUMMARY OF THE INVENTION

The present invention provides various embodiments of an improved game playing environment. In one embodiment, the natures of various NPCs within the game may be varied from time to time within the game. Thus, for example, a given NPC may be controlled at one point in the game to ask a player (through the player's avatar) to help him be freed from a trap during one player-to-NPC interaction, but may, through use of embodiments described herein, want the player's assistance in becoming mayor of the town on the next interaction. This change in the NPC's "goal" within the game is accomplished automatically, meaning that no additional software development or releases of "patches" to the game are required of the game developers and supporters. Thus, players cannot predict what will happen when they move through the game and reach a location at which they can interact with a given NPC, making the game-playing experience ever fresh and challenging.

In one embodiment, the on-line game server will determine in-game time periods (e.g., a day and a night within the computer-generated game environment), and at the beginning of each such time period will examine the current status of each NPC, where "status" refers to the set of values currently assigned to that NPC as maintained by the game server for each NPC. Based on each NPC's current status, one or more of a large set of predefined goals will be assigned to each NPC for the new time period, after which the next in-game time period will be started.

During a respective time period, any player who chooses to interact with a given NPC will be given an opportunity to assist (or impede) that NPC in reaching its currently assigned goal by performing a set of steps during an interaction. That set of steps may also be variable, and may be assigned by the on-line game server at the beginning of the interaction between the player and the NPC, based on the current status of the NPC, including its currently assigned goal, and the current state of the player's avatar.

Each new player-to-NPC interaction may therefore result in the definition of a new series of steps that the player can elect to perform (or not) in order to assist (or block) the NPC from accomplishing its currently assigned goal. The series of steps may be selected such that, if accomplished, they result in the achievement of that goal. The series of steps may also be matched to the player's current state so that the player can actually perform all of the steps within the currently defined series of steps at his or her current level of experience and skill-set. As a result, a player's current interaction with a given NPC may be quite different from previous interactions with that NPC.

BRIEF DESCRIPTION OF THE DRAWINGS

A more complete understanding of the present invention and its preferred embodiment as disclosed herein may be obtained by referring to the detailed description and claims in conjunction with the following Figures, wherein like reference numbers refer to similar elements throughout the Figures and the written description.

FIG. 3 is an exemplary definition of a non-player character;

FIG. 4 is an exemplary definition of a player (avatar);

FIG. 5 is an exemplary definition of a goal;

FIG. 6 is an exemplary definition of a step;

DETAILED DESCRIPTION OF THE EMBODIMENTS

Definition of Terms

Figure 1:
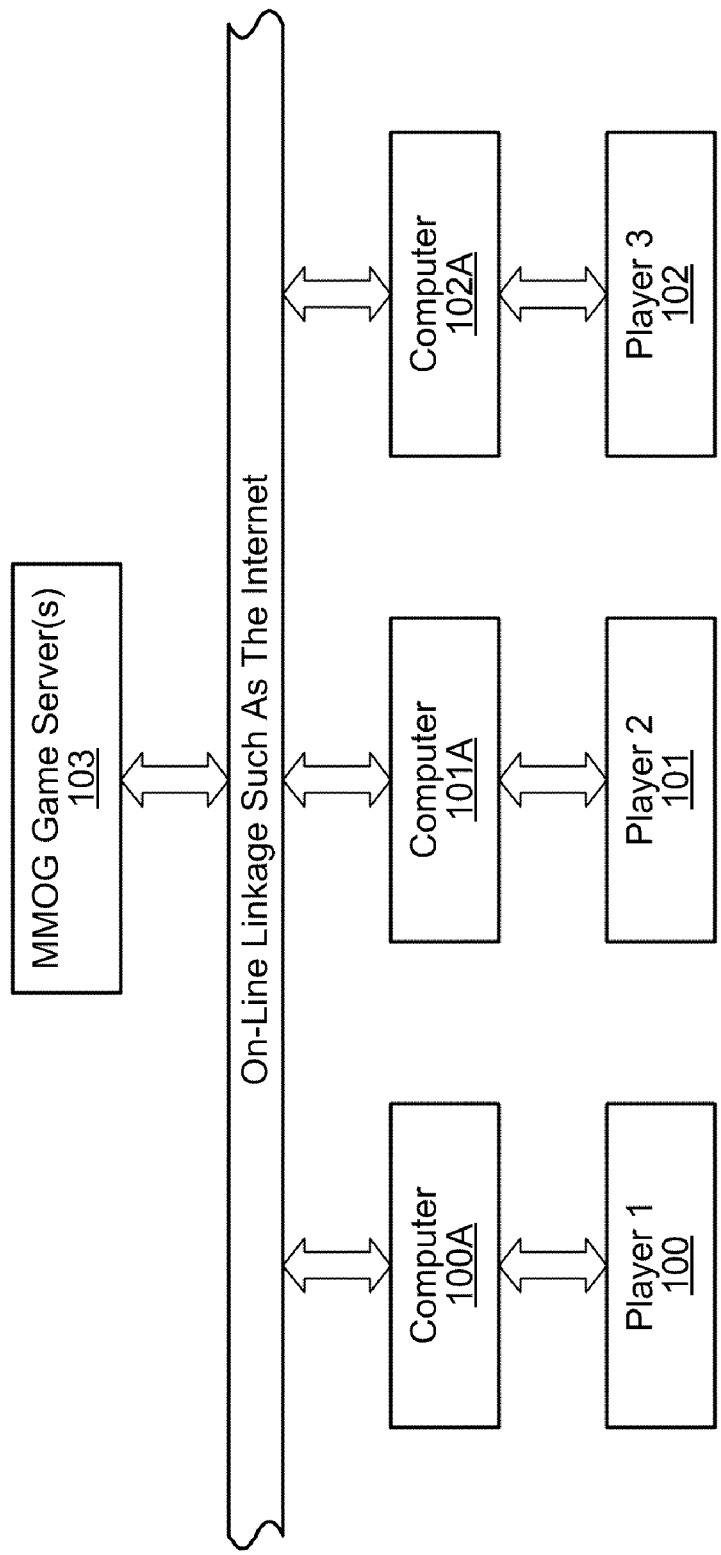
FIG. 1 is a representation of the manner in which several player have used their computers to link to an on-line MMOG server.

To simplify the descriptions, explanations, and claims provided herein, the following terms are used. In each such usage, those terms have the meaning assigned below:

Player—a human participant in the on-line game. A player may optionally pay for the right to participate in the on-line game.

NPC—A Non-Player Character within the on-line game environment. NPCs are typically created so that players can interact with them. An example of an NPC in a medieval game environment could be a weapons vendor in a marketplace.

Goal—an objective assigned to a given NPC at a given time which can be accomplished with assistance from a player through interaction within the game environment. An example of a goal within a medieval game environment could be to be elected mayor of the town within which a given NPC is currently located.

Step—a specific action within the on-line environment which can be performed by a player; a step may be performed on behalf of or in conjunction with an NPC.

Values—traits or characteristics which can be assigned to an NPC. Examples of possible values could be the NPC's morality-level, family-commitment, faction-commitment, and/or town-commitment.

State—the status of a player's character (avatar) within the game, generally comprising a set of attained values and skills based on the past experiences and actions performed by that character under the direction of the player.

Interaction—an in-game experience involving a player's avatar and an NPC.

Result—a change in a player's state and/or an NPC's values as the result of the player's accomplishing a step during an interaction.

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Computer System—any of various types of computing or processing systems, including a personal computer system (PC), server computer system, mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Embodiments of the invention are described herein in terms of functional block components and various processing steps. It should be realized that each such block may be realized by executing properly written software on any of a large number of computer hardware systems, that software being written to perform the processing steps described herein.

Embodiments of the present invention are generally explained herein in the context of a medieval role-playing game. That context is provided only for assistance in explaining embodiments of the invention, and should not be interpreted as restricting the methods disclosed and claimed herein to only that type of game. The methods disclosed and claimed can readily be implemented in a wide variety of game contexts by those of ordinary skill in the art.

It should also be appreciated that the particular implementation described herein is illustrative only of the best mode of the present invention currently known to the inventors, and is not intended to limit the scope of the invention, as claimed herein, in any way. Many well-known aspects of embodiments described herein (e.g., graphical generation of scenes and images, use of a software engine to support in-game activities by players through their avatars, or the use of communications linkages such as the Internet to link players and game servers) are not described in detail herein. Also, the flowcharts and examples of possible software implementations shown herein are provided only as exemplary representations of how embodiments of the present invention may be implemented.

General System Environment

FIG. 1 is a diagrammatic representation showing an exemplary on-line role playing game system according to one embodiment. The system comprises respective player or user computer systems (100A, 101A, and 102A) coupled through a network, such as the Internet, to one or more server computers (game servers) 103. The one or more server computers 103 may comprise a memory medium which stores on-line role playing software (program instructions and data) which implements embodiments of the invention as described herein. Each of the various player computer systems (100A, 101A, and 102A) may also store and/or execute software to implement all or only a portion of the methods described herein. Game servers 103 may implement those methods in conjunction with computers such as 100A.

As shown in FIG. 1, three exemplary MMOG players (100, 101, and 102) may operate respective computer systems (100A, 101A, and 102A), having optionally paid the appropriate fee for participation, and having logged on via the network to gain access to an MMOG game server 103. In so doing the players have gained access to their individual in-game personas (their avatars) and are then able to move those avatars from location to location within the game environment. As they do so, they may meet and interact with the avatars of other players, as well as with NPCs maintained by the game server system. As noted above, the respective computer systems (100A, 101A, and 102A) may require appropriate installed software to participate in the on-line game. It is also noted that embodiments of the invention may also be implemented in role-playing games that are not "on-line", i.e., single or user role-playing games implemented on a single computer.

Interactions with NPCs allow players to advance their status in ways well known to those in the MMOG art. Player's avatars may exchange in-game monies or other in-game goods that their avatars have previously collected or earned, as by paying a weapons-merchant NPC to obtain a new sword, skill, or armor. In so doing, the player changes the status of his or her avatar, possibly allowing their in-the-game persona to perform new actions, to reach new locations, or to withstand additional threats.

Figure 2:
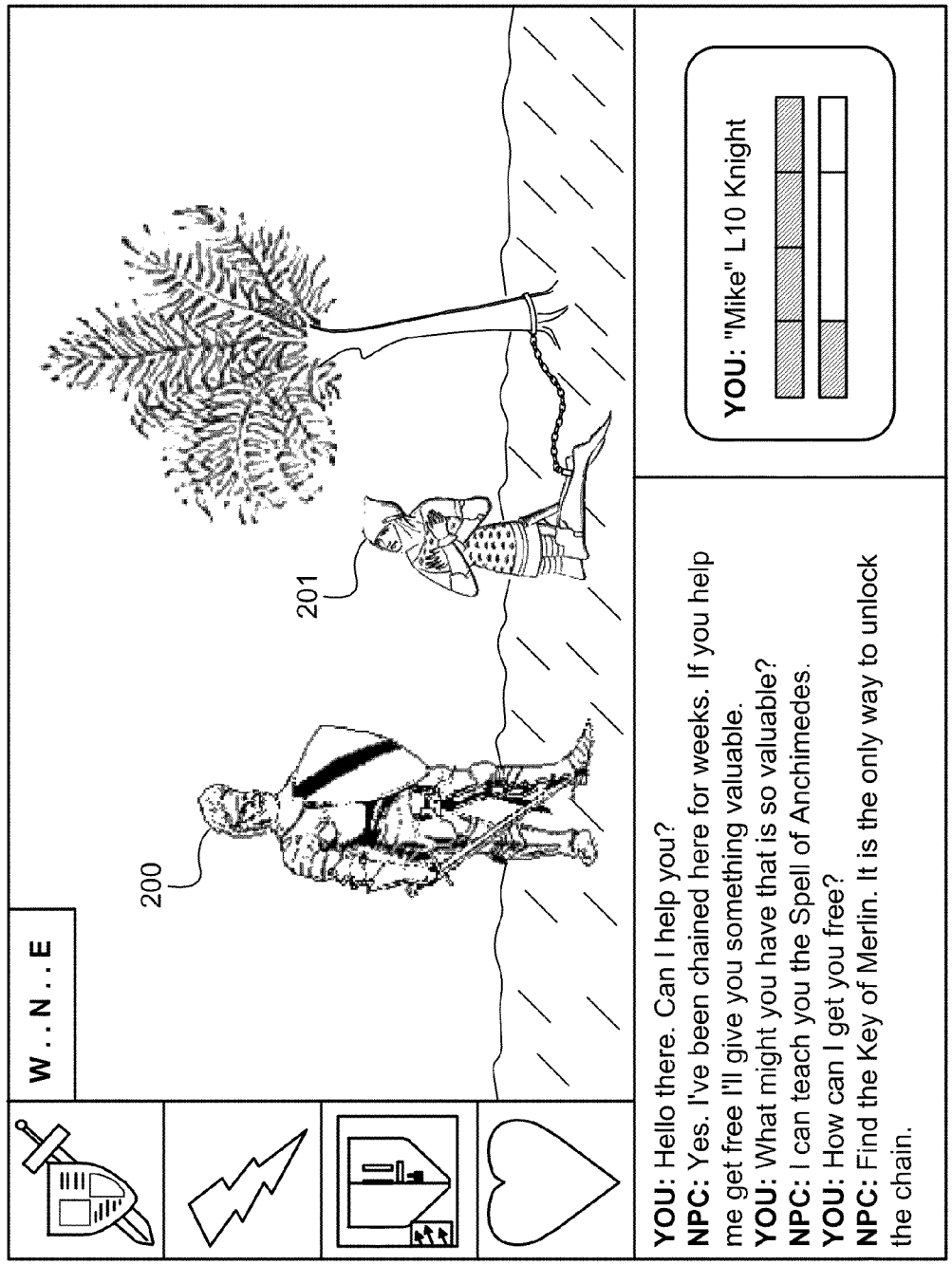
FIG. 2 an example of a computer-generated scene with an NPC and a player's avatar in the process of a player-to-NPC interaction.

With specific respect to a player-to-NPC interaction, FIG. 2 shows an exemplary computer-generated scene. In that scene a player's avatar 200 has moved to an in-game location wherein that avatar can interact with an NPC 201 found at that location. At the present in-game time, that NPC is chained to a tree, and his current goal is to seek assistance in being freed from the chain.

In supporting the possible player-to-NPC interaction shown in FIG. 2, the on-line game server has examined: (a) the current values and goal associated with that NPC, and (b) the current status of the player's avatar. Based on that examination, the game server has created a series of steps (e.g., finding the "Key of Merlin," bringing it to the NPC, and opening the lock at the end of the chain) that can be performed by a player having that status and which, if completed, will accomplish the goal currently being sought by the NPC, as well as add a new skill to the player's avatar. That series of steps has been shown to the player within the exemplary textbox 203 shown in FIG. 2.

As explained below, that series of steps will be unique to the current interaction between the player and the NPC. According to some embodiments of the invention, if the player chooses to interact with that same NPC during a future in-game time period, the NPC's goal, the NPC's values, and the player's state, and hence the series of steps defined for that new interaction, may be different, bringing a newness to the player's in-game experiences.

Pre-Assignment Implementation

During creation of an MMOG which will incorporate an embodiment of the present invention, the game developers will, using programming techniques known to those of skill in the art, create a landscape of locations within the in-game environment and a set of NPCs which will populate that environment along with the avatars of the game players. Each NPC will be defined to have a set of values. An exemplary definition of a generalized NPC is shown in FIG. 3, using the syntax of the C++ language. It is noted that a specific syntax or language is not required to implement the methods described herein.

As shown in FIG. 3, a given NPC may carry a variety of characteristics, priorities, and at least one currently assigned goal. In some embodiments, a given NPC may have two or more goals, which may be prioritized and also may be assigned to the NPC for different time periods within the game.

At game-start-up, each NPC is seeded with an initial set of values appropriate to the general nature of the NPC, where, for example, a "priest" NPC would likely be assigned a high morality-level (say 95 on a scale of 0 to 100), a "mother" NPC would likely be assigned a high family-commitment, a "guild leader" NPC would likely be assigned a high faction-commitment, and a "mayor" NPC would likely be assigned a high town-commitment. A "thief" NPC, on the other hand, would be assigned a low morality-level. The values of a given NPC may vary as the game progresses, and will be stored at the game server so as to be maintained from one game-playing session to another.

Somewhat similarly to the definition of NPCs and their characteristics, the avatar created by each fee-paying player will carry an in-game state which may also be stored at the game server so as to be maintained from one game-playing session to another. An exemplary definition of a player is shown in FIG. 4, again using C++ syntax. In this example the player has certain personal characteristics, skill, and is in possession of a set of in-game objects such as tools or weapons.

In addition, at start-up game developers, using the new methods described herein, will define a set of goals which may be assigned to appropriate NPCs during the Goal-Assignment Process (GAP), as described below. Each defined goal will have specified values assigned to it, limiting the set of NPCs which can be assigned a given goal to only those NPCs which meet or exceed that specified values at the time goals are assigned to NPCs by the GAP. A given goal, such as "I want to become my town's sheriff," for example, may be specified to require the following minimum values of an NPC before it can be assigned to that NPC:

Morality Level >85
Family-Commitment >40
Faction-Commitment >70
Town-Commitment >80

As a result, an NPC failing to meet or exceed its goal's required minimum values will not be assigned the "become sheriff" goal until that NPC has improved its set of values. However, other goals could be assigned to the NPC, which, when achieved, result in improved values, possibly leading to opportunities to be assigned loftier goals in future in-game time periods. Losses in value by NPCs may also affect the assignment of goals, as well, and goals can be assigned maximum values, as well.

An exemplary definition of a goal is shown, again using C++ syntax, in FIG. 5. As shown in that example, a given goal may involve minimum and/or maximum values for various NPC values, as well as required possessions. Also note that a given goal can be assigned a lifetime which is defined in terms of the in-game time frame (e.g., five in-the-game days), after which the goal will be removed from the associated NPC, possibly necessitating a new goal assignment to that NPC the next time the GAP is performed.

The large set of pre-defined goals may also include goals which require certain statuses within the in-game environment. A "become sheriff" goal, for example, may require that the position of sheriff in the town associated with an NPC have a vacancy in that position (which may result in the need to create that position or to eliminate the current sheriff). The manner in which such statuses are defined will depend on the manner in which the in-game environment is implemented, using techniques well known to those of skill in the art. Once defined, the goal assignment process defined above may test the statuses associated with any goal that includes required statuses in its definition.

In addition to creating the set of goals at start-up, game developers using the methods described herein may create a set of steps which can be accomplished by players within the game. Like the pre-defined goals, each pre-defined step will have associated requirements which allow (or disallow) that step to be performed by a given player. An exemplary definition of a step, again using C++ syntax, is shown in FIG. 6.

As an example of the requirements which might be assigned to a given step, consider a step called "kill the rat" which might be assigned to assist an NPC who needed a rat skin to make a new hat. The requirements and results associated with that step might be understood as follows:

Step: kill_the_rat
Results: Specified increase in status (player's/avatar's combat level increases)
Specified increase in resources (player has a new rat skin to give to the NPC)
Conveyance of an event (back door of cellar opens)
Requirements on Player: (required skills and levels to try to kill the rat)
Requirements on associated NPC: (values required of associated NPC to allow it to make a hat)

One aspect of certain embodiments is that the large set of goals and large set of steps may be pre-defined by the MMOG developers during implementation of the game, but neither goals nor sets of steps may be assigned to any specific NPC at that time. In one embodiment, assignment of goals and assignment of sets of steps occur dynamically as the game is played, as explained in the following sections, although developers are free to add new goals and/or steps at any time. Thus the addition of new content to make the game appear fresh to its players is no longer a requirement due to the implementation of the methods described herein.

The Overall Game Process

Figure 7:
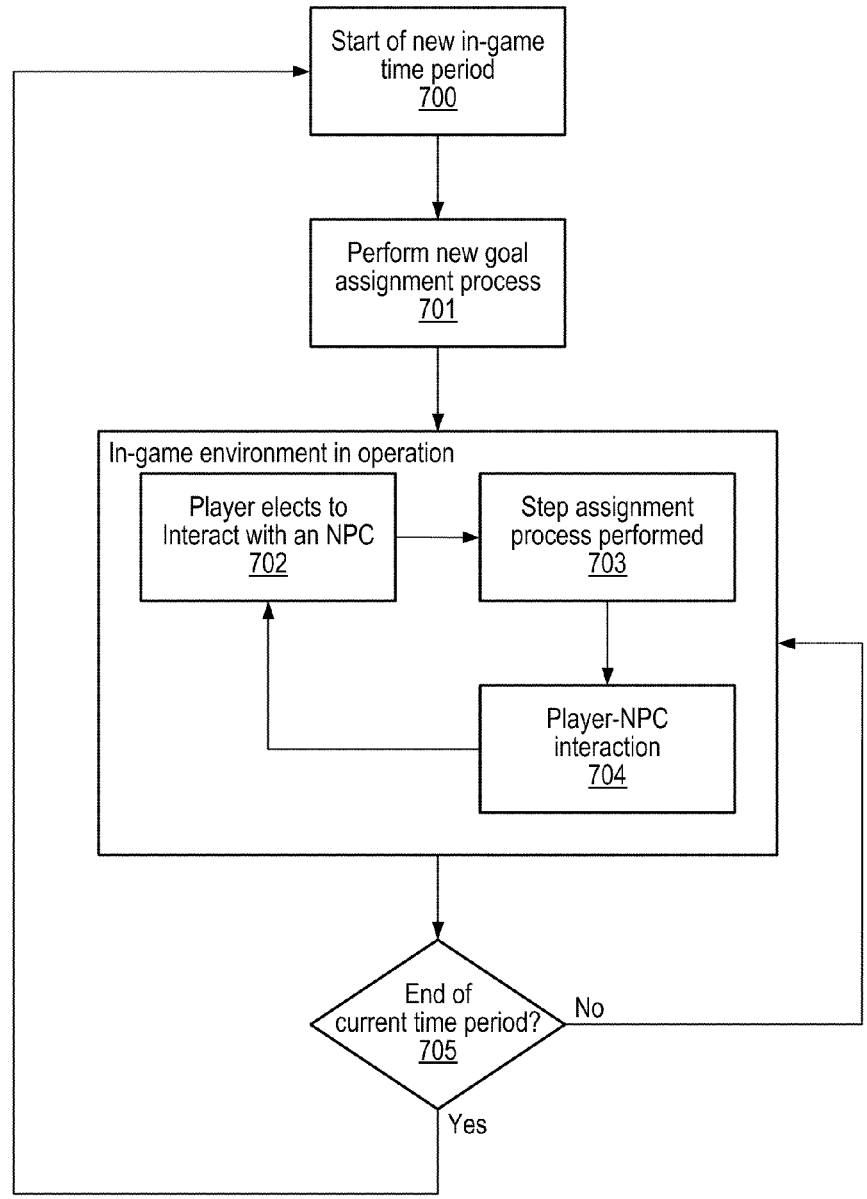
FIG. 7 is a flowchart showing the overall process of the preferred embodiment of the present invention.

The top-level flowchart of FIG. 7 illustrates one embodiment that can be incorporated into a role-playing game. As shown at blocks 700 and 701 in FIG. 7, at the start of each new in-game or out-of-game time period (say at dawn in a game that makes use of days and nights as an in-game time period, or midnight CST for a game that makes use of an out-of-game time period), the GAP of the present invention is used to assign goals to various NPCs, as appropriate. The goals assigned to some NPCs may not be changed, of course, but it is expected that some NPCs will be given new goals based on changes to their values due to in-game events in the past time period, or to expiration of the lifetime assigned for some of the assigned goals.

In some embodiments, the GAP may be performed at various different times, (e.g., other than the start of a new in-game time period), such as when goal(s) of one or more NPCs have been satisfied, or based on status increases of avatars in the game, or other criteria or events. The GAP is intended to be transparent to any players currently involved in the game (meaning that goals associated with current interactions should generally not be re-assigned).

After the new GAP has completed the re-assignment process, the game itself can be continued for all players. However, now when a player initiates an interaction with a given NPC, the GAP is performed anew, as shown at blocks 702 to 704 in FIG. 7. That process takes into account the currently assigned goal(s) for the NPC, the NPC's current set of values, and the player's current in-game state. This data is used to define a set of steps which are appropriate to having the player help the NPC meet their currently assigned goal. That set of steps may generally persist until the goal is accomplished or the player elects to end the interaction. In one embodiment, an NPC's goal may be terminated or changed based on a time period or other criteria, regardless of whether the goal has been accomplished or the player elects to end the interaction.

The process of FIG. 7 repeats at the end of the current in-game time period, as shown at block 705.

The Goal-Assignment Process

Figure 8:
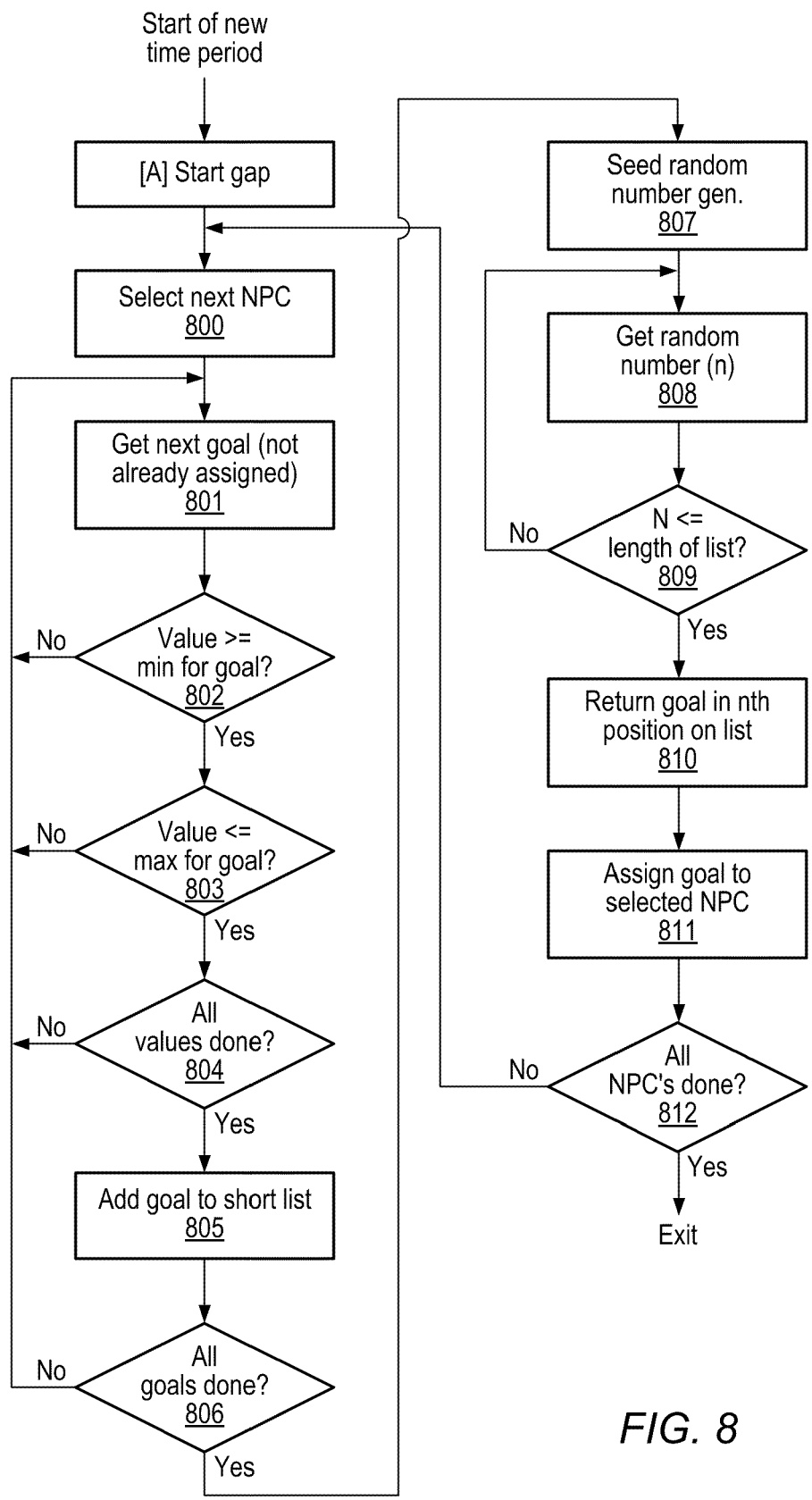
FIG. 8 is a flowchart describing additional detail of the goal-assignment process provided by the preferred embodiment of the present invention.

FIG. 8 is a flowchart of the goal-assignment process of the preferred embodiment of the present invention. This flowchart is entered at [A], preferably at the beginning of each of the in-game time periods. As shown in block 800, the goal-assignment process (GAP) represented by the flowchart selects each NPC, in turn, one at a time, until all of the NPCs in the game environment have been selected.

At block 801 a candidate goal is selected from the set of goals.

At blocks 802 to 804, for the currently selected NPC, the GAP compares the values currently assigned to that NPC against the minimum and/or maximum value requirements established for each goal within the pre-designed goal-set which has not already been assigned to an NPC. That comparison process results in a set of "candidate goals" for the selected NPC, referred to as the "Short List" of goals in FIG. 8.

The short list of goals is then passed to steps 806 to 810 where, as an example, a random value, say N, is used to select a goal from the short list. That goal is then assigned to the currently selected NPC at step 811, staying with that NPC for its defined lifetime, or until some other event in the game results in the need to reassign a new goal to the selected NPC.

The assignment of a specific goal can be implemented in a variety of ways. A random selection of a goal from the set of candidate goals can be made as illustrated in FIG. 8. Alternatively, the first or last goal in the short list could always be selected. As another alternative, a list of the last N goals assigned to each NPC can be maintained, with those goals being excluded from the new assignment—if possible—to avoid repetitive goal assignment to the same NPC.

Therefore, the goals may be selected in various ways and/or based on various criteria. For example, goals may be selected randomly or pseudo randomly. Alternatively, or in addition, goals may be dynamically selected based various factors, such as the states of the various avatars in the game (e.g., the alignments of morality levels of the various avatars, their level, etc.), prior goals attained, etc. As noted above, in some embodiments, two or more goals may be selected for some or all of the NPCs.

As shown for the preferred embodiment of the GAP, at block 812 a test is made to see if all of the NPCs have been selected and assigned a goal for use during the new in-game time period. If not, the GAP returns to block 800 to select the next unassigned NPC for goal assignment. The GAP proceeds until all NPCs have been evaluated and possibly assigned new goals. The GAP thus automatically creates a new in-game environment for the players when the next in-game time period starts. As noted above, some NPCs, e.g., those who have not yet attained their prior goal, may not be assigned a new goal.

The Step-Assignment Process

Figure 9:
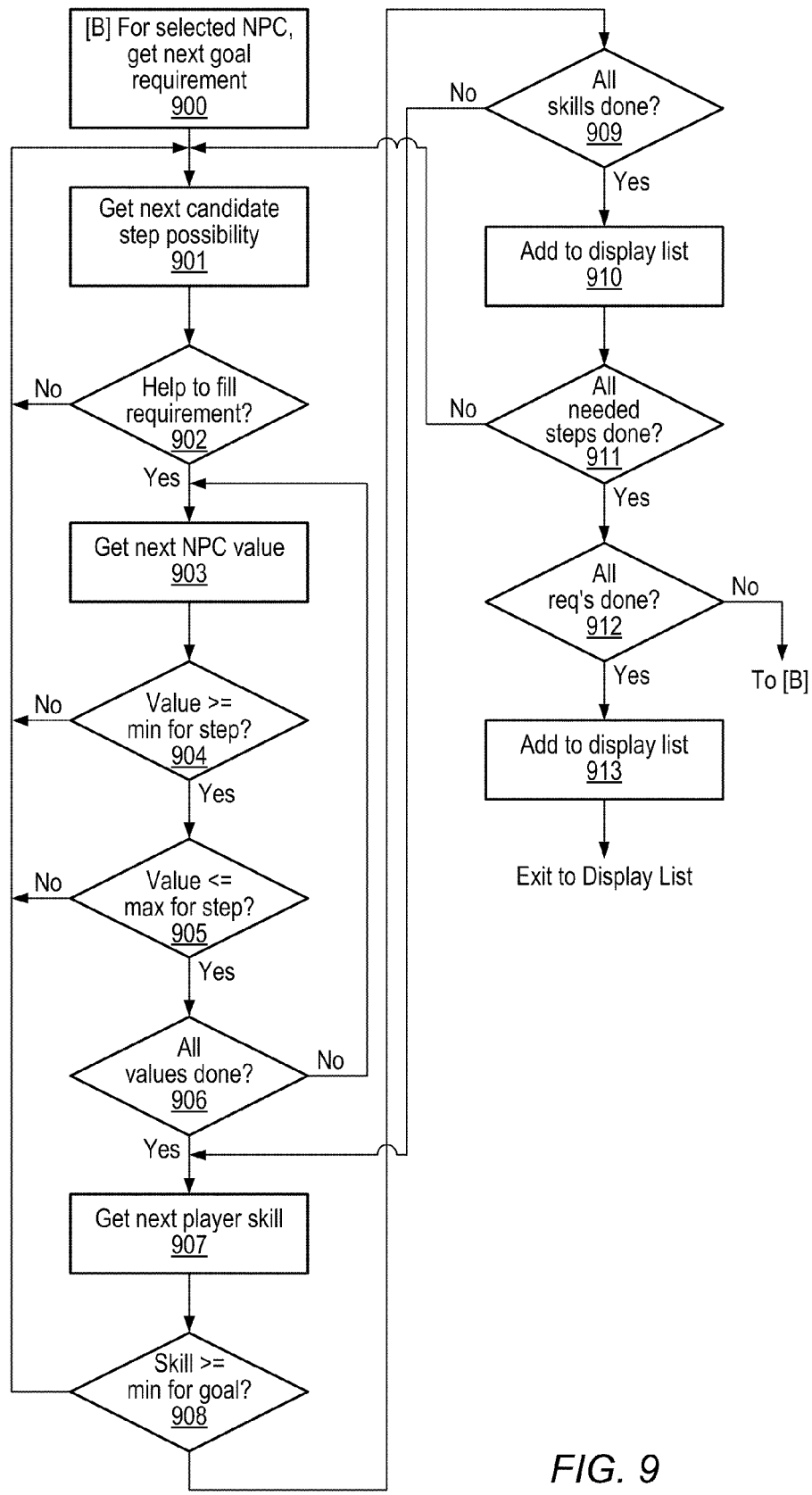
FIG. 9 is a flowchart describing additional detail of the step-assignment process provided for each player-to-NPC interaction by the preferred embodiment of the present invention.

FIG. 9 shows a flowchart of the process of the preferred embodiment that creates an appropriate set of steps each time a player elects to have his or her avatar interact with a given NPC (the active NPC). This flowchart is entered at [B] each time a player moves his or her avatar into a position wherein a player-to-NPC interaction can take place, in a manner well known to those of skill in the art.

As shown in block 900, the exemplary step-assignment process (SAP) represented by the flowchart begins by selecting a requirement defined for the goal currently assigned to the active NPC. That selection will then be repeated for each and every one of those requirements.

Next, at block 901 a candidate step from the pre-defined set of steps is selected as a possible step to be performed by the player during the interaction with the active NPC. At block 902 the SAP then compares the results that will be achieved from accomplishing the candidate step against the values needed to accomplish the requirement (and/or the overall goal) currently assigned to the active NPC. This comparison process results in a determination as to whether or not accomplishment of the candidate step will be useful in achieving the requirement (and/or the overall goal) assigned to the active NPC.

As shown in the preferred embodiment, at blocks 903 to 906 each candidate step from the set of pre-defined steps is compared to the current values of the active NPC. If the active NPC currently meets the minimum and/or maximum comparisons shown in steps 904 and 905, the candidate step is passed to block 907.

In blocks 907 to 909 the state of the player planning to interact with the active NPC is compared to the requirements on player state defined for the goal assigned to that NPC. If those requirements are met, the candidate step is added to the list of steps to be presented to the player to be used during the following interaction with the active NPC at block 910.

Next, at block 911 the needed increases in values required for the active NPC to accomplish its assigned goal and other changes in values are compared to the results that will be achieved if all of the steps on the list of steps are accomplished. If not, the SAP returns to block 901 to add an additional step (or steps) to the list of steps.

At block 912 the SAP checks to determine whether or not all requirements for achieving the active NPC's currently assigned goal will be met through performance of the current list of steps, and the SAP moves to block 913 to exit and display the list of steps to the player. If not, the SAP returns to [B] at block 900 to identify an additional step (or steps) which must be added to the list of steps as needed to identify a set of steps which, when accomplished, will meet all of the requirements of that goal.

Although the present invention has been described with reference to particular embodiments, it is to be understood that those embodiments are merely illustrative of the principles and applications of that invention. It is therefore to be understood that numerous modifications may be made to the illustrative embodiments and that other arrangements may be devised without departing from the spirit and scope of the present invention as defined by the appended claims.

What is claimed is:

1. A method for varying the experiential content available to human players of an on-line role-playing game comprising:

a computer providing an in-game environment having a number of computer-generated, computer-controlled, non-playing characters (NPCs) with which human players can interact;

the computer providing a pre-defined set of goals which are available for assignment to the NPCs within the in-game environment, wherein for each goal of the set of goals, the computer provides a pre-defined set of candidate steps which are operable by human players during in-game play to assist an NPC to which the goal is assigned in achieving the goal;

within an in-game time frame defined by the computer for use within the in-game environment, the computer assigning a specific goal randomly selected from at least a subset of the set of goals to one of the NPCs, wherein the specific goal remains assigned to the one of the NPCs for at least the duration of the in-game time frame, and wherein the specific goal is not assigned to any other NPC while it is assigned to the one of the NPCs; and within the in-game time frame, in response to a human player electing to interact with the one of the NPCs, the computer dynamically defining a set of one or more steps from among the set of candidate steps for the specific goal which, if accomplished by the human player during the in-game time frame, will result in the one of the NPCs achieving the specific goal.

2. The method of claim 1, further comprising:
assigning a respective set of values to at least some of the NPCs, wherein the set of values assigned to an NPC is stored and made available to be carried forward from one game-playing session to the next;
wherein the assignment of the specific goal to the one of the NPCs is based, at least in part, on the set of values currently assigned to the one of the NPCs within the in-game environment.

3. The method of claim 2,
wherein at least some of the values assigned to the one of the NPCs are numerical values; and
wherein at least one of the numerical values is increased or decreased by the computer in response to interactions that take place within the in-game environment between the human player and the one of the NPCs.

4. The method of claim 3,
wherein human players carry a status within the in-game environment based on their prior game-playing experience, and wherein the in-game status of a given human player is stored and made available to be carried forward from one game-playing session to the next; and
wherein each candidate step has a defined set of requirements which must be met by the human player in order for the human player to be allowed to undertake the performance of that candidate step in the in-game environment.

5. The method of claim 4,
wherein successful performance of a candidate step by the human player produces one or more results within the in-game environment;
wherein each of the one or more results changes at least one of: the status of the human player, or a value assigned to the one of the NPCs; and
wherein said meeting the defined set of requirements comprises comparing the human player's current status to one or more required status characteristics associated with each candidate step.

6. The method of claim 5, wherein defining the set of steps comprises one or more of:
comparing the defined set of requirements of each candidate step to the current status of the human player; or
comparing the one or more results of accomplishing each candidate step to a change in value required to allow the one of the NPCs to meet the specific goal.

7. The method of claim 6, wherein defining the set of steps comprises selecting a candidate step for which the status of the human player meets the requirements of the candidate step or selecting a candidate step for which the results of accomplishing the candidate step will contribute to the change in value required to allow the one of the NPCs to meet the specific goal.

8. The method of claim 1, wherein the specific goal carries a time limit within the in-game time frame of the in-game environment, and wherein the method comprises, at the end of that time limit:
the computer deleting the specific goal assigned to the one of the NPCs; and
the computer assigning a new goal randomly selected from at least a subset of the set of goals to the one of the NPCs.

9. The method of claim 1, further comprising:
within a subsequent in-game time frame, the computer assigning a different goal randomly selected from a subset of the set of goals other than the at least a subset of the set of goals to the one of the NPCs for at least the duration of the subsequent in-game time frame.

10. A non-transitory, computer-readable storage medium, storing:
information regarding one or more computer-generated, computer-controlled, non-playing characters (NPCs) of a role-playing game;
a pre-defined set of goals which are available for assignment to the one or more NPCs within the role-playing game, and for each goal of the set of goals, a pre-defined set of candidate steps operable by player-controlled avatars to assist an NPC to which the goal is assigned in achieving the goal; and
program instructions that when executed by one or more computers cause the one or more computers to perform:
for a given in-game time frame, assigning a specific goal randomly selected from at least a subset of the set of goals to one of the one or more NPCs within the role-playing game, wherein the specific goal remains assigned to the one of the NPCs for at least the duration of the in-game time frame, and wherein the specific goal is not assigned to any other NPC while it is assigned to the one of the NPCs;
within a subsequent in-game time frame, assigning a different goal randomly selected from a subset of the set of goals other than the at least a subset of the set of goals to the one of the NPCs for at least the duration of the subsequent in-game time frame; and
during operation of the role-playing game, dynamically determining a set of steps from among the candidate steps stored for a goal that is currently assigned to the one of the NPCs which, if accomplished by a player-controlled avatar, will result in the one of the NPCs achieving the goal currently assigned to the one of the NPCs.

11. The storage medium of claim 10, wherein said assigning a specific goal is performed based at least in part on the stored information regarding the one of the NPCs in the role-playing game.

12. The storage medium of claim 11,
wherein when executed by one or more computers, the program instructions further cause the one or more computers to perform:
within the in-game time frame, in response to a player-controlled avatar electing to interact with the one of the NPCs, the computer presenting the defined set of one or more steps, said defined set of steps persisting for at least the duration of the interaction with the one of the NPCs.

13. The storage medium of claim 12, wherein when executed by one or more computers, the program instructions further cause the one or more computers to perform:
during operation of the role-playing game, presenting the defined set of steps to the player-controlled avatar, said defined set of steps persisting for at least the duration of an interaction between the player-controlled avatar and the one of the NPCs.

14. The storage medium of claim 13, wherein said determining the defined set of steps comprises:
selecting one of the candidate steps stored for the specific goal;
comparing results that will be achieved from accomplishing the candidate step to one or more values needed to accomplish the specific goal assigned to the one of the NPCs;

determining whether accomplishment of the candidate step will be useful in achieving the specific goal assigned to the one of the NPCs; and;

in response to determining that accomplishment of the candidate step will be useful in achieving the specific goal assigned to the one of the NPCs, adding the candidate step to the defined set of steps to be presented to a human player operating the player-controlled avatar during interaction with the one of the NPCs.

15. The storage medium of claim 14, wherein when executed by one or more computers, the program instructions further cause the one or more computers to perform:

storing information regarding one or more avatars in the role-playing game, wherein said information includes state information; and wherein said determining the defined set of steps further comprises:

comparing a state of the player-controlled avatar planning to interact with the one of the NPCs to requirements on avatar state defined for the specific goal assigned to the one of the NPCs; and wherein said adding the candidate step to the defined set of steps is performed only if the state of the player-controlled avatar meets the requirements on avatar state.

16. The storage medium of claim 13, wherein the specific goal has one or more requirements;

wherein, for each of said one or more requirements, said determining the defined set of steps comprises:

selecting a requirement defined for the specific goal assigned to the one of the NPCs;

selecting one of the candidate steps stored for the specific goal;

comparing results that will be achieved from accomplishing the candidate step against values needed to accomplish the requirement;

determining whether accomplishment of the candidate step will be useful in achieving the requirement;

comparing the state of the player-controlled avatar planning to interact with the one of the NPCs to requirements on avatar state defined for the requirement; and in response to determining that accomplishment of the candidate step will be useful in achieving the requirement and that the player-controlled avatar meets the requirements on avatar state, adding the candidate step to the defined set of steps, wherein the defined set of steps is operable to be presented to a human player operating the player-controlled avatar during interaction with the one of the NPCs.

17. The storage medium of claim 10, wherein when executed by one or more computers, the program instructions further cause the one or more computers to perform:

storing information regarding one or more player-controlled avatars in the role-playing game;

wherein said assigning the specific goal is performed based at least in part on the stored information regarding the one or more player-controlled avatars in the role-playing game.

18. The storage medium of claim 10, wherein said assigning the specific goal comprises:

comparing values currently assigned to the one of the NPCs against minimum or maximum value requirements established for each of a plurality of goals within the set of goals;

determining a set of candidate goals for the one of the NPCs based on said comparing, wherein the at least a subset of the set of goals comprises the set of candidate goals;

randomly selecting the specific goal from the set of candidate goals; and, assigning the selected the specific goal to the one of the NPCs.

19. The storage medium of claim 10, wherein said determining the defined set of steps to be presented to the player-controlled avatar is performed in response to the player-controlled avatar encountering the one of the NPCs in the role-playing game.

20. A system for providing an on-line role-playing game, the system comprising:

a processor;

a memory, storing:

information regarding one or more computer-generated, computer-controlled, non-playing characters (NPCs) in the role-playing game;

information regarding a pre-defined set of goals which are available for assignment by the system to the NPCs within the role-playing game, and for each goal of the set of goals, information regarding a pre-defined set of candidate steps which are operable by human players during in-game play to assist an NPC to which the goal is assigned; and program instructions that when executed by the processor cause the processor to perform:

within an in-game time frame defined by the system for use within an in-game environment, assigning a specific goal randomly selected from at least a subset of the set of goals to one of the one or more NPCs within the role-playing game, wherein the specific goal remains assigned to the one of the NPCs for at least the duration of the in-game time frame, and wherein the specific goal is not assigned to any other NPC while it is assigned to the one of the NPCs; and within the in-game time frame, in response to a human player electing to interact with the one of the NPCs, dynamically defining a set of one or more steps from among the set of candidate steps for the specific goal which, if accomplished by the human player during the in-game time frame, will result in the one of the NPCs achieving the specific goal; and a network port for providing information regarding the role-playing game to at least one player computer, and for receiving input from a human player through the at least one player computer.

* * * * *